United States Patent Office 3,711,457
Patented Jan. 16, 1973

3,711,457
FLUID TRANSFER CONTROL SYSTEM
Charles A. Ayres, Bartlesville, Okla., assignor to
Phillips Petroleum Company
Filed Feb. 19, 1971, Ser. No. 116,754
Int. Cl. C08f 1/96, 3/02, 3/06
U.S. Cl. 260—93.7                    10 Claims

ABSTRACT OF THE DISCLOSURE

A fluid control system is provided whereby the continuous transfer of fluid from a source location to an ultimate location is accomplished while maintaining in the source location a substantially constant pressure and while maintaining in the ultimate location a substantially constant temperature: by controlling the transfer of fluid from the source location to the ultimate location in response to the pressures in the source location and in the transfer conduit connecting the source location and the ultimate location; and by controlling the heating of fluid in the transfer conduit in response to the temperatures in ultimate location and in the transfer conduit.

---

This invention relates to controlling the continuous transfer and heating of fluid within a fluid system while maintaining a desired pressure within the system. This invention further relates to controlling the temperature and pressure of a solution of normally solid material while continuously transferring the solution from one location in a fluid system to another location in the fluid system. This invention still further relates to a fluid transfer control system whereby the continuous transfer of a viscous solution of a normally solid material from a source location to an ultimately intended treatment location is accomplished while controlling the pressure in the source location and controlling the temperature in the treatment location.

While the control system of this invention has broad application, as will be apparent to those skilled in the control system art, it is especially applicable to controlling those processes wherein desirable fluid materials are continuously generated in a vessel which is preferably held at a relatively constant pressure. Therefore, this requires that the generated material must be continuously removed from that vessel and transferred to another vessel in order to maintain the continuous nature of the process, i.e., to avoid a shut down or some other interruption of the process.

An example of such a process is the situation where a polymeric dispersion is continuously produced in a high-pressure, liquid-full polymerization reactor and, therefore, must be continuously removed from the polymerization reactor at a rate equal to the rate at which feed materials are introduced into the reactor. In the normal sequence of operations, the polymeric dispersion removed from the polymerization reactor is preferably immediately transferred to a recovery vessel wherein the polymer, for example, which may be in solution or in dispersed form, is recovered from the solvent or dispersant.

If, for some reason, the recovery vessel should fail to accept the polymeric dispersion feed, or if the rate of acceptance is reduced below the rate of withdrawl from the reactor, there is then experienced a pressure increase in the fluid system which can result in a detrimental effect upon the reaction polymerization or even a vessel or line rupture. In this situation the reactor is shut down, or the fluid product vented, or stored until the difficulty with the recovery vessel is corrected and normal flow conditions resumed.

If, on the other hand, the recovery vessel should develop a capacity to accept polymer feed at a rate greater than the desirable reactor withdrawal rate, there is then experienced a pressure decrease in the system which can result in a detrimental effect upon the polymerization reaction, such as premature vaporization of solvent resulting increase or plugging. In this situation reactor pressure is maintained by blocking flow lines which decreases normal flow conditions or worse, the reactor is shut down.

There is thus presented the problem of sensing changing pressure conditions in the reactor and the fluid handling system and then taking prompt remedial action to both preserve the desirable constant pressure in the reactor as well as to transfer from the reactor generated fluid at normal continuous flow rates.

It is thus the object of this invention to provide a process and apparatus for controlling the transfer of fluid within a fluid system while maintaining a relatively constant pressure within at least a portion of the system.

It is another object of this invention to provide a fluid control system for maintaining pressure in a first portion of the system and temperature in a second portion of the system while continuously transferring fluid from the first portion to the second portion.

Other objects, aspects and the many advantages of this invention will be apparent to those skilled in the art from a study of the following specification, figure and appended claims.

In accordance with this invention there is provided a control system whereby there is provided method and apparatus for controlling the continuous transfer of fluid from a fluid source zone to a fluid treatment zone while maintaining pressure in the fluid source zone comprising determining the respective pressure in the fluid source zone and in a first fluid transfer zone connecting the fluid source zone and the fluid treatment zone, and, in response to these pressure determinations, controlling the transfer of fluid from the source zone to either one or both, of the treatment zone, via the first fluid transfer zone, or a fluid surge zone, via a second fluid transfer zone connecting the fluid surge zone and the first fluid transfer zone. Also, in accordance with this invention, there is provided method and apparatus for controlling the temperature of the fluid treatment zone comprising determining the respective temperatures of the fluid in the first fluid transfer zone and in the fluid treatment zone, and, in response to these temperature determinations, controlling the introduction of a heat exchange medium into a heat exchange zone wherein it passes in heat transfer relationship with the fluid contained in the first fluid transfer zone.

Reference is now made to the drawing which is a diagrammatic representation of the process of my invention.

According to the overall process of my invention, fluid contained in vessel 1, the fluid source zone, is continuously removed therefrom and transferred to vessel 22, the fluid treatment zone, via conduit 15. Under certain conditions, however, the fluid is transferred from vessel 1 to vessel 29, the fluid surge zone, via conduits 15 and 30. The fluid thus transferred to vessel 29 can be then continuously removed therefrom and either recycled to vessel 29 via conduits 40 and 42 or both recycled to vessel 29 and transferred to vessel 22 via conduits 40 and 15 in addition to the flow of fluid from vessel 1.

For purposes of illustration and for a better understanding of my invention, the description of the drawing shall be in connection with the production of polyethylene and of its recovery from a solution thereof by means of a flash-vaporization and comminuting technique, i.e., a hot solution of the polymer under considerable pressure is passed into a low pressure chamber where most of the solvent vaporizes leaving the polymer as a solid precipitate which is chopped to desired particle size.

Referring now to the drawing, solvent enters polymerization reactor 1 via conduit 2. Ethylene with another olefin such as butene-1 if desired enters polymerization reactor 1 via conduit 3 and catalyst is introduced into polymerization reactor 1 via conduit 4. The catalyst can be, for example, chromium oxide supported on silica. In polymerization reactor 1, the catalyst and monomer are mixed, and reaction to produce polyethylene proceeds at a temperature in the range of 280° to 320° F. and at a pressure in the range of 445 to 455 pounds per square inch gauge, preferably 450 p.s.i.g. The pressure in polymerization reactor 1 is sufficient to maintain the solvent in liquid phase, and the reactor is liquid full. The solvent can be cyclohexane, octane, or some other suitable solvent, and the proportions of solvent and ethylene are adjusted such that the concentration of polymer in the reactor is in the range of from 20 to 40 percent by weight.

The polyethylenes prepared in polymerization reactor 1 are prepared by the process of Hogan and Banks, U.S. Pat. No. 2,825,721, wherein an aliphatic 1-olefin having a maximum chain length of 8 carbon atoms and no branching nearer the double bond than the 4-position is subjected to polymerization conditions in the presence of a catalyst comprising chromium oxide, of which a portion of the chromium is initially hexavalent, associated with at least one oxide selected from the group consisting of silica, alumina, zirconia and thoria.

The pressure in reactor 1 is measured by pressure measuring means 5 which produces a first pressure signal representative of the pressure in reactor 1. This first pressure signal is transmitted to pressure control means 6 via suitable transmitting means such as line 7. In pressure control means 6 the first pressure signal is compared with a first set point signal 8 which is representative of the pressure desired in reactor 1. For purpose of this illustration the value of the first set point signal, and thus the desired pressure in reactor 1, is 450 p.s.i.g. Pressure control means 6 produces a second set point signal representative of the pressure desired at a point upstream of valve A in the vicinity of pressure measuring means 9. When the pressure in reactor 1 is at its set point value (450 p.s.i.g.) then the value of the second set point signal, and thus the desired pressure at pressure measure means 9, is approximately 440 p.s.i.g. The second set point signal is transmitted to pressure control means 10 via suitable transmitting means such as line 11 and to pressure control means 12 via suitable transmitting means such as line 11, switch gear 13, and line 14. The pressure in conduit 15 is measured by pressure measuring means 9 which produces a second pressure signal representative of the pressure in conduit 15. This second pressure signal is transmitted to pressure control means 10 via line 16, and to signal adjustment means 17 via line 16, line 18, and switch 19. The second pressure signal is compared with the second set point signal in pressure control means 10. As a result of the comparison in pressure control means 10, a first control signal is produced which is transmitted to valve A via line 20. Valve A then reacts in response to the first control signal to adjust its position by an amount sufficient to produce the desired pressure in polymerization reactor 1.

As a result of the foregoing pressure measuring and control sequence and the appropriate positioning of valve A relative thereto, polymer solution is passed from polymerization reactor 1 via conduit 15, indirect heat exchange means 21, and valve A and thereafter introduced into flash-chopper 22, which is maintained at a temperature in the range of 200° to 225° F. and at a pressure of approximately 12 pounds per square inch gauge. Thus, when the high pressure, high temperature polymer solution passes through valve A into flash-chopper 22 there is a rapid change in pressure which causes the solvent to rapidly evaporate from the solution with the result that the polymer is condensed out in a solid form which is chopped to particles of desired size. Solid, solvent-free, polymer particles are removed from flash-chopper 22 via valve 61 in conduit 23 and solvent evaporated from the polymer solution leaves flash chopper 22 via conduit 24 and back pressure regulating valve 25 which is set to maintain pressure within flash-chopper 22 at or about the aforementioned 12 pounds per square inch gauge pressure. Accompanying the flash evaporation is a reduction in temperature, the control of which is discussed hereinafter.

The flash-chopper 22 has associated therewith a chopping means wherein the solid polymer produced during the flash vaporization is reduced to a predetermined size. The flash-chopping means has a knife-carrying member with three or more arms, each of which carries a knife blade. In the event the polymer solution, which is in the highly viscous form, should partially or completely solidify within valve A, due to evaporation induced by the pressure drop across valve A, or should the solid or semi-solid polymer become plugged in the chopping means, then the flow of solution through valve A will stop or the rate of flow will decrease as compared to the rate of flow of feed streams 2, 3 and 4 into reactor 1 with the result that the pressure upstream of valve A in the vicinity of pressure measuring means 9 will increase, thus the system of controller 10 and valve a can no longer control the pressure in conduit 15.

The second pressure signal introduced into signal adjustment means 17 by line 18 and switch 19 is reduced by a fixed negative quantity 26. Signal adjustment means 17 produces a third pressure signal which is introduced into pressure control means 12 via line 27. The third pressure signal is less than the second pressure signal by an amount equal to the value of the fixed negative quantity 26 which for purpose of this illustration is 2 p.s.i.g. The third pressure signal is compared with the second set point signal in pressure control means 12 wherein a second control signal is produced and thereafter transmitted to valve B via line 28. The control signal transmitted to valve B via line 28 is representative of the position of valve B required to produce the desired pressure plus fixed quantity 26 in conduit 15 in the vicinity of pressure measuring means 9. Valve B in response to the control signal then adjusts its setting to admit polymer solution from conduit 15 to flash surge zone 29 via conduit 30. When the actual pressure measured by pressure measuring means 9 is less than 2 p.s.i.g. (the fixed negative quantity 26 in adjustment means 17) in excess of the second set point value, then valve B is closed and no polymer solution flows from conduit 15 to surge tank 29.

By the use of signal adjusting means 17, valve B reacts only to an excessive pressure in conduit 15 as measured by pressure measuring means 9, thus responding in the event of overload or malfunction of valve A and/or flash-chopper 22.

The same control signal produced by pressure control means 12 which is transmitted to valve B by line 28 can be produced by an alternate technique. According to the alternate technique, the second set point signal produced by pressure control means 6 is transmitted to signal adjustment means 31 via line 11, switch 32, and line 33. In signal adjustment means 31, the magnitude of the second set point signal is increased by a fixed positive quantity 34 to produce an adjusted signal which is representative of a third set point signal which is introduced into pressure control means 12 via line 35. The third set point signal is compared in pressure control means 12 with the second pressure signal produced by pressure measuring means 9 which is introduced into pressure control means 12 by line 16, switch 36 and line 37. The comparison of the third set point signal with the second pressure signal produces the same control signal transmitted to valve B as the comparison of the second set point signal with the third pressure signal. Of course, during operation of the control system, only one of adjusting means 17 and 31 is employed. Accordingly, the adjusted signal produced is representative of one of a third set point signal and a third pressure signal. In this embodiment, it is preferred that adjusting means 17 be employed. Accordingly, switches 19 and 13 are positioned to transmit the second pressure signal and the second set point signal and switches 36 and 32 are positioned to prevent the transfer of the second pressure signal and the second set point signal, respectively.

The polymer solution introduced into fluid surge vessel 29 is under pressure. For example, when the desired pressure in polymerization reactor 1 is 450 pounds per square inch, the desired pressure in conduit 15 in the vicinity of pressure measuring means 9 is approximately 440 pounds per square inch gauge. Thus, when utilizing signal adjustment means 17 the result is that valve B does not open until an actual pressure of at least approximately 442 pounds is registered upstream of valve B. However, since the pressure in fluid surge vessel 29 is preferably maintained at 100 p.s.i.g. the polymer solution introduced into fluid surge vessel 29 is reduced in pressure. This pressure reduction is accomplished by vapor removal via pressure regulating valve 38 disposed in line 39. In vessel 29, a portion of the solvent is evaporated and removed through line 39 as the pressure on the polymer solution is reduced.

The polymer solution in vessel 29 can be circulated from vessel 29 via line 40, pumping means 41, line 42, and valve C and re-introduced into vessel 29. In this particular embodiment where the fluid being treated is a solution of polyethylene, it is important to keep the contents of vessel 29 in an agitated condition as the solution is quite viscous and tends to stratify upon prolonged storage and conditions of low temperature. Accordingly, vessel 29 is heated by exterior means, not shown, to maintain the temperature within vessel 29 at a temperature of approximately 300° F. and the polymer solution in vessel 29 is maintained in constant circulation by adjusting valve C to open in response to the pressure measured by pressure measuring means 43, even when fluid is passing valve D. Pressure measuring means 43 measures the pressure of the polymer solution in conduit 42 at a point upstream of valves C and D which point is under the influence of the fluid pressure produced by pumping means 41. A fourth pressure signal representative of the pressure measured by pressure measuring means 43 is transmitted to pressure control mean 44 via line 45. In pressure control means 44, the fourth pressure signal is compared with a fourth set point value 46 representative of the pressure at which valve C is to open. Because, as previously mentioned, it is desired that valve C remain partially open at all times, the value of fourth set point value 46 is somewhat less than the pressure produced by pumping means 41 as measured by pressure measuring means 43. In the present embodiment, the pressure measured by pressure measuring means 43 is in the range of 450 to 470 pounds per square inch gauge with the fourth set point value 46 being preferably 460 pounds per square inch gauge. Pressure control means 44 produces a third control signal which is transmitted to valve C via transmitting means 47 which control signal causes the positioning of valve C required to produce the pressure in the vicinity of pressure measuring means 43 equal to the value of the set point value 46.

It is desirable to maintain at least a minimum fluid level in fluid surge vessel 29. Accordingly, valve D operates to open only when the level of fluid in vessel 29 is greater than the desired minimum level. Fluid level measuring means 48 measures the level of fluid in vessel 29 and valve D responds to the measured fluid level to either open or close, depending upon the fluid level in vessel 29 as related to the desired minimum fluid level.

As previously mentioned, when the fluid in conduit 15 is a solution of polyethylene, it tends to solidify upon loss in pressure due to premature vaporization of solvent or due to lowering of temperature. Premature solidification is easily possible in valve A, thus a critical phase of the transfer of polymer solution from vessel 1 to vessel 22 resides in the balance of pressure and temperature in the vicinity of valve A. Also, as previously mentioned, the solution entering flash-chopping vessel 22 is subjected to rapid decompression to promote vaporization of the liquid to thus produce solid polymer which is choped, as previously described, in flash-chopper 22. In order to prevent plugging of the chopping mechanism on account of melted or otherwise sticky polymer, the temperature in flash-chopper 22 should not exceed the melting point of the polymer. However, the temperature in flash-chopper 22 must be high enough to reduce the quantity of solvent in the solid polymer to a very low degree in that it is highly desirable to free the polymer from the solvent as completely as possible because small concentrations, for example, a few weight percent of solvent in the polymer, form bubbles upon extrusion of said polymer and consequently cavities when the polymer is heated preparatory to molding. There is thus presented a control problem of maintaining a temperature in flash-chopper 22 at a level below the melting point of the polymer and at the same time at a sufficiently high level to evaporate the solvent from the polymer is order to produce a substantially dry, solid product.

The polyethylenes prepared by the process of Hogan and Banks, U.S. Pat. 2,825,721, ordinarily have melting points in the range of 240° to 260° F. but can have melting points outside this range. It is, however, essential to the recovery of the desired solid polymer by flash vaporization to maintain the temperature of the polymer in the chopping zone below the melting point of the particular polymer being processed. One reason for preventing the polymer from melting in the chopping zone is that melted polymer could plug conduit 15 at a point, for example, downstream of valve A and thus prevent the passage of polymer solution at its normally desired rate into flash-chopper 22 which would create an increase in pressure which would cause the opening of valve B and thus the movement of the polymer solution to vessel 29 as described above.

The vaporization of the solvent in flash-chopper 22 cools the polymer solution, therefore, the quantity of solvent which will ultimately be removed from the dry polymer is reduced without exterior heating, thus the temperature control problem referred to above can be solved by heating the polymer solution in conduit 15 responsive to the temperature of the chopped polymer particles in flash-chopper 22 and the temperature of the fluid in conduit 15. The vaporization rate and the quantity of solvent removed is also dependent upon the pressure maintained in flash-chopper 22 which pressure level is maintained as previously described with respect to the operation of pressure regulating valve 25. There is thus a critical balance involved between the maintenance of desired values of pressure and temperature within flash-chopper 22 and within conduit 15 upstream of valve A, for example, in the vicinity of pressure measuring means 9. Maintenance of the pressure in the vicinity of valve A and maintenance of the pressure within chopping zone 22 has been described above and control of temperature within chopper 22 is hereinafter described.

The temperature, preferably of the chopped polymer particles, in flash-chopper 22 is determined by temperature measuring means 49 which produces a first temperature signal representative of the temperature in flash-chopper 22. The first temperature signal is transmitted to temperature control means 50 via line 51. In temperature control means 50, the first temperature signal is compared with a fifth set point signal 52 representative of the desired temperature in flash-chopper 22. Temperature control means 50 produces a sixth set point signal representative of the desired temperature of the polymer stream at a point in the vicinity of temperature measuring means 53. The sixth set point signal is transmitted to temperature control means 54 by line 55. Temperature measuring means 53 measures the temperature of the polymer solution in conduit 15 at a point intermediate indirect heat transfer means 21 and flash-chopper 22 to produce a second temperature signal representative of the temperature of the polymer solution in conduit 15. The second temperature signal is transmitted to temperature control means 54 by line 56. The second temperature signal and the sixth set point signal are compared in temperature control means 54 to produce a fourth control signal which is transmitted to valve E via line 58. The fourth control signal is representative of the setting of valve E required to pass a heating medium, such as steam, through valve E to indirect heat transfer means 21 via line 59 in an amount sufficient to adjust the temperature of the polymer solution in conduit 15 as measured by temperature measuring means 53 to a value equal to the sixth set point signal as produced by temperature control means 50. In this particular embodiment, when the desired temperature in flash-chopper 22, as indicated by the fifth set point signal, is 200° F., then the desired temperature in conduit 15, as indicated by the sixth set point signal is approximately 300° F.

During certain periods of operation, it is desirable to prevent the passage of solution through valve A regardless of the requirements of the control signal produced by pressure control means 10 to which valve A would ordinarily respond. Such periods of operation include a start-up period, during which time reactor 1 is being brought to certain desirable conditions of operation, or during periods of transition or shutdown, when reactor 1 is being changed from steady state operation, or during periods when flash-chopper 22 is for some reason unable to accept polymer solution. During these periods of time, valve A can be operated manually through the interruption of the control signal produced by pressure control means 10 which such interruption means can provide for the imposition of a manual load to override the control signal to valve A. Such a manual loading means which can be a high select relay is not shown. The flow regulation function of valve A can also be completely eliminated during such abnormal periods of operation as described above by preventing the control signal from reaching valve A by the aforementioned manual loading means and controlling the movement of polymer solution to flash-chopper 22 by means of bypass valve 60. The interruption of the normal operation of valve A occurs during the periods of abnormal operation, such as those described above, however, it is pointed out that during such periods the polymer solution produced in polymerization reactor 1 is being treated in otherwise normal fashion by the operation of valve B, surge vessel 29, pump 41, valve D and valve C. When normal operations are resumed, valve A is then returned to automatic operation.

In summary the control of the fluid transfer as above described is effected by the fluid control system of my invention substantially as follows. During the substantially steady state operation of vessel 1, all the fluid generated in vessel 1 is discharged from vessel 1 at a relatively constant rate and transferred via conduit 15 and control element A to vessel 22. At this time control element A is at least partially open, and control element B is completely closed, thus there is no flow in conduit 30, and control element D can be completely closed to thereby retain in vessel 29 any fluid that is contained therein. However, in order to effect constant circulation and mixing of the fluid contained in vessel 29, control element C can be adjusted to remain at least partially open, for example, in response to pressure produced by pump 41. In addition, and even during steady state operation of vessel 1, the minimum quantity of fluid contained in vessel 29 can be controlled by control element D in response to the level of fluid contained in vessel 29. Thus, during certain conditions when there is a greater quantity of fluid in vessel 29 than desired, control element D opens, and, under the influence of pump 41, the excess fluid in vessel 29 is transferred from vessel 29 to vessel 22 via conduits 40 and 15. This transfer continues until control element D closes in response to the level of fluid in vessel 29. During any transfer of fluid from vessel 29 to vessel 22, control element A opens to admit this fluid such that the desired pressure in, and the desired rate of flow from vessel 1 is not interrupted to any substantial degree.

Control element A responds to changing pressure in conduit 15, as determined by pressure measuring means 9, located upstream of control element A, by either opening or closing depending upon whether the pressure in conduit 15 is increasing or decreasing. Thus, upon increasing pressure, control element A opens to pass more fluid into vessel 22 so as to maintain a constant pressure in vessel 1. If pressure in conduit 15 continues to rise even after control element A has opened, control element B then opens in response to the continued rise in pressure to thus pass fluid into vessel 29. Introducing fluid into vessel 29 causes the level of fluid in vessel 29 to rise, and in response to the rising fluid level, control element D opens in an attempt to maintain a desired fluid level in vessel 29. As control element D opens control element C tends to close.

When the cause of the original change, for example an increase in pressure in conduit 15 is eliminated and pressure in the system begins to diminish, the process described above reverses itself. Thus, as the pressure in conduit 15 (measured by pressure measuring means 9) starts to decrease control elements C and B start to close. As the pressure in conduit 15 continues to fall, control element B eventually completely closes and control elements D and A tend to close at least somewhat as the desired level of fluid in vessel 29 is approached and normal pressures are achieved in vessel 1 and conduit 15. Control element D is completely closed when the level of fluid in vessel 29 is at the desired minimum level. At this point, control element A is open just enough to pass fluid to vessel 22 at the same rate that fluid is generated in vessel 1, control element C is open under the influence of pressure from pump 41, and control elements B and D are closed.

The conventional measurement and control equipment previously described are available from many automatic controller manufacturers utilizing pneumatic or electronic energy or combinations of the two as the analog of the measurement and control signals. The techniques of Direct Digital Control are also applicable.

Equipment capable of performing the control functions in the pressure and temperature control means is available in either pneumatic or electronic form, as desired, from several manufacturers. In most instances, complex automatic control and optimizing systems will use both pneumatic and electronic instrumentation, computation and control to the best advantage. Measurement inputs and computing networks must be compatible in their analogies. Therefore, in some cases, transducers from pneumatic to electrical signal or vice versa are required to achieve operability and mathematical consistency. The individual control instruments which are employed by our invention are themselves conventional and well known in the art. Our invention lies in the manner in which these instruments are employed and connected to receive the specific signals of the process described above. For example, the pressure and temperature measuring means 5, 9, 43, 49 and 53, which can be transducers, and pressure and temperature control means 6, 10, 12, 44, 52, and 54 are conventional, a number of these instruments being described in the ISA Journal, 6, No. 1 pages 44 through 79, January 1959. The instruments can be either electronic or pneumatic. The signal adjustment means 17 and 31 can be Foxboro Co., Foxboro, Mass., type M/56-3 adding relays. Control means 6, 10, 12, 44, 52, and 54 can be Foxboro Model 58P-4 controllers. The above Foxboro controller and relays are pneumatic instruments but electronic instruments could be used as well. Descriptions of computers which could be used for signal adjustment means 17 and 31 can be found in the applications manual for Philbrick Octal Plug-In Computing Amplifiers GAP/R K2 series, George A. Philbrick Researches, Inc., 230 Congress St. Boston, Mass. (1956). On page 17 of this catalog an adder-subtracter circuit is described which includes the functions of both signal adjustment means 17 and 31. On page 16, subtracter and adder circuits are also described which could be employed separately for signal adjustment means 17 and 31.

As will be evident to those skilled in the art, various modifications of this invention can be made or followed in light of the foregoing disclosure and discussion without departing from the spirit or scope thereof.

Having described my invention that which is claimed is:

1. A process for controlling the transfer of fluid within a fluid system comprising a fluid source zone, a fluid treatment zone, a fluid surge zone, a first fluid transfer zone and a second fluid transfer zone, wherein said fluid source zone is connected to a first end of said first fluid transfer zone, said fluid treatment zone is connected to a second end of said first fluid transfer zone, and said fluid surge zone is connected to said first fluid transfer zone by means of said second fluid transfer zone and wherein pressure in said source zone is controlled while transferring at least a portion of fluid contained in said source zone to said treatment zone, said process comprising the steps of:
 (a) measuring the pressure in said source zone and producing a first pressure signal representative thereof;
 (b) comparing said first pressure signal with a first set point signal in a first pressure control zone to produce a second set point signal;
 (c) measuring the pressure in said first transfere zone and producing a second pressure signal representative thereof;
 (d) comparing said second pressure signal with said second set point signal in a second pressure control zone and producing a first control signal;
 (e) introducing fluid from said source zone via said first transfer zone into said treatment zone in response to said first control signal;
 (f) independently changing the magnitude of one of said second set point signal and said second pressure signal in an adjustment zone wherein there is produced an adjusted signal of increased magnitude if representative of one of a third set point signal and of decreased magnitude if representative of a third pressure signal;
 (g) comparing said adjusted signal with the other of said second set point signal and said second pressure signal in a third pressure control zone and producing a second control signal; and
 (h) introducing fluid from said first transfer zone via said second transfer zone into said surge zone in response to said second control signal.

2. In the process of claim 1, the additional steps of transferring at least a portion of the fluid contained in said fluid surge zone to said fluid treatment zone via a third fluid transfer zone in combination with said first fluid transfer zone while simultaneously circulating and re-introducing at least a portion of said fluid into said fluid surge zone via third fluid transfer zone in combination with a fourth fluid transfer zone wherein said circulating is controlled by:
 (a) measuring the pressure in said fourth fluid transfer zone and producing a fourth pressure signal representative thereof;
 (b) comparing said fourth pressure signal with a fourth set point signal in a fourth pressure control zone and producing a third control signal, and
 (c) introducing fluid from said third transfer zone into said surge zone via said fourth transfer zone in response to said third control signal.

3. In the process of claim 2, the additional steps of controlling the temperature of said fluid treatment zone wherein said fluid while in said first fluid transfer zone is passed in heat exchange relationship with a heat exchange medium in a heat exchange zone, said temperature being controlled by:
 (a) measuring the temperature in said fluid treatment zone and producing a first temperature signal representative thereof;
 (b) comparing said first temperature signal with a fifth set point signal in a first temperature control zone and producing a sixth set point signal;
 (c) measuring the temperature in said first fluid transfer zone and producing a second temperature signal representative thereof;
 (d) comparing said second temperature signal with said sixth set point signal in a second temperature contral zone and producing a fourth control signal; and
 (e) introducing said heat exchange medium into said heat exchange zone in response to said fourth control signal.

4. The process of claim 3 wherein said adjustment zone changes the magnitude of said second pressure signal by a fixed negative quantity such that said third pressure signal is less than said second pressure signal and said third pressure signal is then compared with said second set point signal in said third pressure control zone.

5. The process of claim 4 wherein said fluid source zone is a polymerization zone, said fluid treatment zone is a flash-chopper zone, and said fluid is a solution of a normally solid thermoplastic polymer obtained by polymerizing at least one 1-olefin having from 2 to 8 carbon atoms per molecule.

6. An apparatus for controlling pressure in a first vessel while transferring fluid from said first vessel to a second vessel, said apparatus comprising a first vessel, a second vessel, a third vessel, a first conduit connecting said first vessel and said second vessel, a second conduit connecting said third vessel and said first conduit, said first and second conduits joining in a point intermediate said first vessel and said second vessel, a first control element disposed in said first conduit in a location intermediate said second vessel and said point of joining of said first and second conduits, a second control element disposed in said second conduit, a first pressure measuring means for measuring pressure in said first vessel and for producing a first pressure signal representative thereof, a second pressure measuring means for measuring pressure in said first conduit, at a point intermediate said first control element and said first vessel, and for producing a second pressure signal representative thereof, a first pressure control means for comparing said first pressure signal with a first set point signal and for producing a second set point signal, a second pressure control means for comparing said second set point signal with said second pressure signal and for producing a first control signal, a signal adjustment means for changing the magnitude of one of said second pressure signal and said second set point signal and for producing an adjusted signal representative of one of a third pressure signal and a third set point signal, a third pressure control means for comparing said adjusted signal with the other of said second pressure signal and said second set point signal and for producing a second control signal, a first transmitting means for transmitting said first pressure signal from said first pressure measuring means to said first pressure control means, second transmitting means for transmitting said second pressure signal from said second pressure measuring means to said second pressure control means, third transmitting means for transmitting said second pressure signal from said second pressure measuring means to one of said signal adjustment means and said thrid pressure control means, fourth transmitting means for transmitting said second set point signal from said first pressure control means to said second pressure control means, fifth transmitting means for transmitting said second set point signal from said first pressure consaid third pressure control means, sixth transmitting means for transmitting said adjusted signal from said signal adjustment means to said third pressure control means, seventh transmitting means for transmitting said first control signal from said second pressure control means to said first control element and eighth transmitting means for transmitting said second control signal from said third pressure control means to said second control element.

7. The apparatus of claim 6 containing in addition a third conduit connecting said third vessel and said first conduit, said first and third conduits joining in a point intermediate said first vessel and said first control element, a fourth conduit connecting said third conduit and said third vessel, said third and fourth conduits joining in a point intermediate said third vessel and said point of joining of said first and third conduits, a pumping means disposed in said third conduit in a location intermediate said third vessel and said point of joining of said third and fourth conduits, a third control element disposed in said fourth conduit, a third pressure measuring means for measuring pressure in said fourth conduit at a point intermediate said third control element and said third conduit, and for producing a fourth pressure signal representative thereof, a fourth pressure control means for comparing said fourth pressure signal with a fourth set point signal and for producing a third control signal, ninth transmitting means for transmitting said fourth pressure signal from said third pressure measuring means to said fourth pressure control means, and tenth transmitting means for transmitting said third control signal from said fourth pressure control means to said third control element.

8. The apparatus of claim 7 containing additional means for controlling the temperature of said fluid transferred from said first vessel to said second vessel, said additional means comprising heat transfer means disposed in said first conduit intermediate said first vessel and said first control element, a fourth control element for admitting a heating medium to said heat transfer means, a fifth conduit connecting said heat transfer means and said fourth control element, a first temperature measuring means for measuring temperature in said second vessel and for producing a first temperature signal representative thereof, a second temperature measuring means for measuring temperature in said first conduit in a point intermediate said heat transfer means and said second vessel and for producing a second temperature signal, a first temperature control means for comparing said first temperature signal with a fifth set point signal and for producing a sixth set point signal, a second temperature control means for comparing said sixth set point signal with said second temperature signal and for producing a fourth control signal, eleventh transmitting means for transmitting said first temperature signal from said first temperature measuring means to said first temperature control means, twelfth transmitting means for transmitting said second temperature signal from said second temperature measuring means to said second temperature control means, thirteenth transmitting means for transmitting said sixth set point signal from said first temperature control means to said second temperature control means, and fourteenth transmitting means for transmitting said fourth control signal from said second temperature control means to said fourth control element.

9. The apparatus of claim 8 wherein said signal adjustment means reduces the magnitude of said second pressure signal by fixed negative quantity and said third pressure signal resulting therefrom is compared with said second set point signal in said third pressure control means.

10. The apparatus of claim 9 wherein said first vessel is a polymerization reactor, said second vessel is a flash chopper, said third vessel is a surge tank and said fluid is a solution of normally solid thermoplastic polymer obtained by polymerizing at least one 1-olefin having from 2 to 8 carbon atoms per molecule.

References Cited

UNITED STATES PATENTS

| | | | |
|---|---|---|---|
| 3,412,779 | 11/1968 | Wagner et al. | 260—94.9 F |
| 3,036,057 | 5/1962 | Wallace | 260—94.9 F |
| 2,908,734 | 10/1959 | Cottle | 260—94.9 P |

JAMES A. SEIDLECK, Primary Examiner

A. HOLLER, Assistant Examiner

U.S. Cl. X.R.

137—2, 8, 12; 203—88; 260—94.9 F, 94.9 P